United States Patent
Nakagawa et al.

(10) Patent No.: US 12,464,485 B2
(45) Date of Patent: Nov. 4, 2025

(54) DATA CORRECTION DEVICE

(71) Applicant: NTT DOCOMO, INC., Chiyoda-ku (JP)

(72) Inventors: Tomohiro Nakagawa, Chiyoda-ku (JP); Takuya Doumen, Chiyoda-ku (JP); Kazuya Sasaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 311 days.

(21) Appl. No.: 17/639,368

(22) PCT Filed: Sep. 29, 2020

(86) PCT No.: PCT/JP2020/036967
§ 371 (c)(1),
(2) Date: Mar. 1, 2022

(87) PCT Pub. No.: WO2021/065927
PCT Pub. Date: Apr. 8, 2021

(65) Prior Publication Data
US 2022/0322275 A1    Oct. 6, 2022

(30) Foreign Application Priority Data

Oct. 2, 2019  (JP) ................. 2019-182185

(51) Int. Cl.
*H04W 64/00*    (2009.01)
(52) U.S. Cl.
CPC ................ *H04W 64/00* (2013.01)
(58) Field of Classification Search
CPC ...................................... H04W 6/00
(Continued)

(56) References Cited

U.S. PATENT DOCUMENTS

2013/0045752 A1    2/2013  Fukumoto et al.
2013/0181993 A1*   7/2013  Herring ................. G06T 11/206
                                                   345/440
(Continued)

FOREIGN PATENT DOCUMENTS

JP    2001-74494 A    3/2001
JP    2009-292011 A   12/2009
(Continued)

OTHER PUBLICATIONS

Japanese Office Action issued Aug. 30, 2022 in Japanese Patent Application No. 2021-551321 (with English translation), 14 pages.
(Continued)

*Primary Examiner* — Ahmad F. Matar
*Assistant Examiner* — Jirapon Tulop
(74) *Attorney, Agent, or Firm* — Oblon, McClelland, Maier & Neustadt, L.L.P.

(57) ABSTRACT

An object of the present invention is to appropriately correct data based on position data acquired by positioning. A data correction device 1 includes an information storage unit 11 that stores position information including position data acquired by positioning and positioning information relating to the positioning, a filter generation unit 13 that generates a filter on the basis of the positioning information included in the position information stored by the information storage unit 11, and a data correction unit 14 that applies the filter generated by the filter generation unit 13 on the basis of the positioning information included in the position information to data based on the position data included in the position information to thereby correct the data.

8 Claims, 12 Drawing Sheets

(58) Field of Classification Search
USPC .................................................. 455/456.1
See application file for complete search history.

(56) References Cited

U.S. PATENT DOCUMENTS

| | | |
|---|---|---|
| 2015/0038198 A1 | 2/2015 | Fukumoto et al. |
| 2016/0323712 A1 | 11/2016 | Fukumoto et al. |
| 2020/0082416 A1* | 3/2020 | Kimishima ............ G06Q 30/02 |

FOREIGN PATENT DOCUMENTS

| | | | |
|---|---|---|---|
| JP | 2013-42360 A | | 2/2013 |
| JP | 2016122373 A | * | 7/2016 |

OTHER PUBLICATIONS

Nagakubo, S. et al., "A Study on Performance Improvement of GPS Localization Employing Wireless Lan," IEICE Technical Report, Dec. 11, 2014, vol. 114, No. 368, pp. 43-48 (with English translation), 11 total pages.

International Search Report mailed on Dec. 22, 2020 in PCT/JP2020/036967 filed on Sep. 29, 2020, 3 pages.

International Preliminary Report on Patentability and Written Opinion issued Apr. 14, 2022 in PCT/JP2020/036967 (submitting English translation only), 8 pages.

Japanese Office Action issued Jul. 30. 2024 in Japanese Patent Application No. 2023-097573 (with English translation). 8 pages.

\* cited by examiner

*Fig. 4*

| 0.01875 | 0.01875 | 0.01875 | 0.01875 | 0.01875 |
|---------|---------|---------|---------|---------|
| 0.01875 | 0.0375  | 0.0375  | 0.0375  | 0.01875 |
| 0.01875 | 0.0375  | 0.4     | 0.0375  | 0.01875 |
| 0.01875 | 0.0375  | 0.0375  | 0.0375  | 0.01875 |
| 0.01875 | 0.01875 | 0.01875 | 0.01875 | 0.01875 |

Fig. 5

| $1/(n*n)$ | $1/(n*n)$ | ... | $1/(n*n)$ |
| --- | --- | --- | --- |
| $1/(n*n)$ | $1/(n*n)$ | ... | $1/(n*n)$ |
| ... | ... | ... | ... |
| $1/(n*n)$ | $1/(n*n)$ | ... | $1/(n*n)$ |
| $1/(n*n)$ | $1/(n*n)$ | ... | $1/(n*n)$ |

Fig. 10

DATA CORRECTION DEVICE

TECHNICAL FIELD

An aspect of the present disclosure relates to a data correction device that corrects data.

BACKGROUND ART

A printing device disclosed in the following Patent Literature 1 generates correction data by applying a filter according to an environmental temperature, a head temperature, the remaining amount of an ink ribbon, or a paper size to data based on image data.

CITATION LIST

Patent Literature

[Patent Literature 1] Japanese Unexamined Patent Publication No. 2009-292011

SUMMARY OF INVENTION

Technical Problem

It may be better to correct data based on position data acquired by positioning of, for example, the Global Positioning System (GPS) or the like in addition to data based on image data. For example, there is a possibility of a bias occurring in data expanded and estimated on the basis of position data having a small number of samples. Consequently, it is desired to appropriately correct data based on position data acquired by positioning.

Solution to Problem

According to an aspect of the present disclosure, there is provided a data correction device comprising: a storage unit configured to store position information comprising position data acquired by positioning and positioning information relating to the positioning; a generation unit configured to generate a filter on the basis of the positioning information comprised in the position information stored by the storage unit; and a correction unit configured to apply the filter generated by the generation unit on the basis of the positioning information comprised in the position information to data based on the position data comprised in the position information to thereby correct the data.

In such an aspect, the filter generated on the basis of the positioning information relating to positioning is applied to data based on the position data acquired by positioning, and thus the data is corrected. That is, it is possible to appropriately correct the data based on the position data acquired by positioning.

Advantageous Effects of Invention

According to an aspect of the present disclosure, it is possible to appropriately correct the data based on the position data acquired by positioning.

BRIEF DESCRIPTION OF DRAWINGS

FIG. 4 is a diagram illustrating an example of a filter.

FIG. 5 is a diagram illustrating an example of a uniform distribution filter of a matrix of n rows and n columns in which all elements are set to "$1/(n*n)$."

FIG. 10 is a diagram illustrating an example of correction in which a filter is applied to a data distribution.

DESCRIPTION OF EMBODIMENTS

Figure 1:
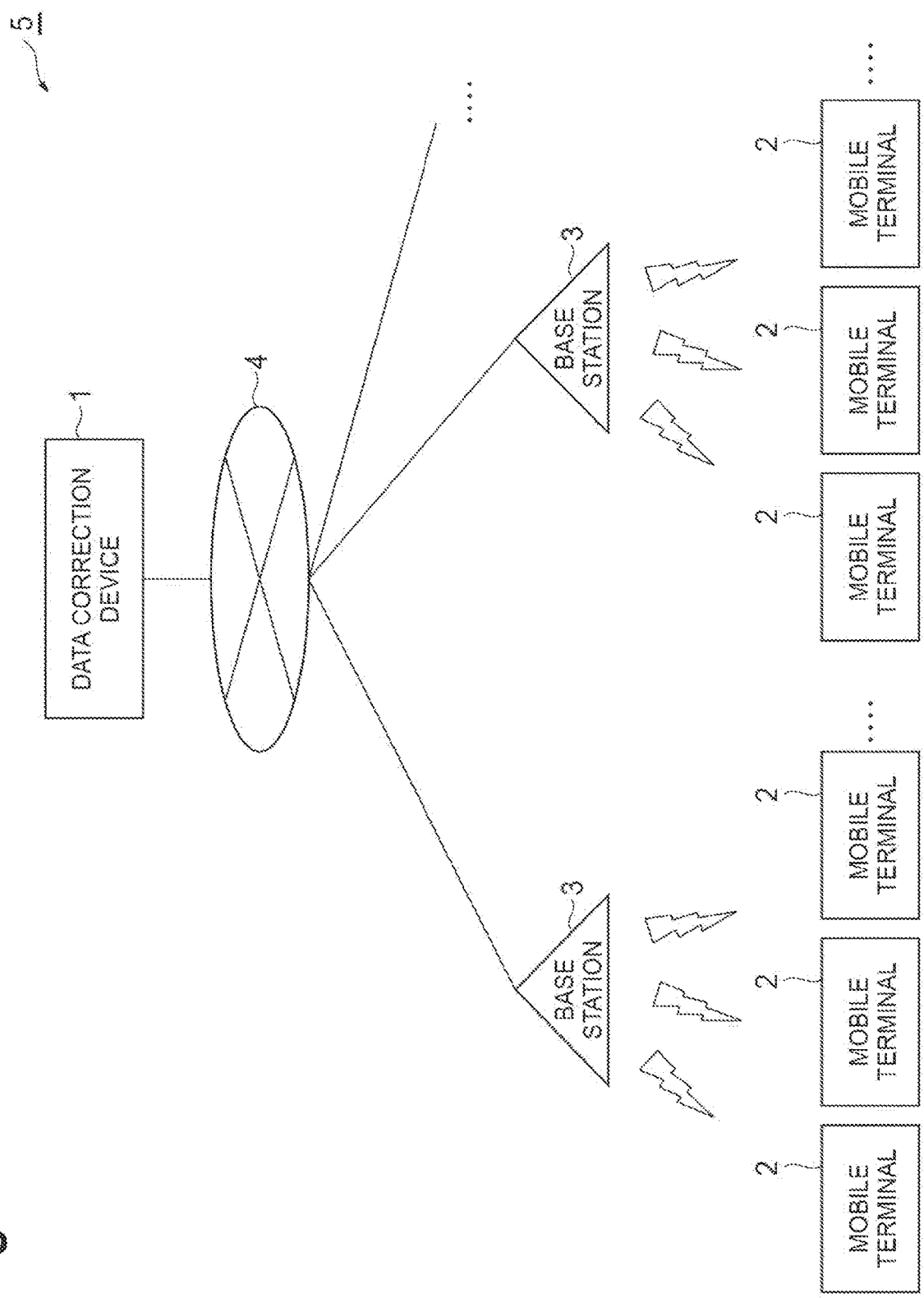
FIG. 1 is a diagram illustrating an example of a system configuration of a data correction system including a data correction device according to an embodiment.

Hereinafter, embodiments in the present disclosure will be described in detail with reference to the accompanying drawings. Meanwhile, in the description of the drawings, the same components are denoted by the same reference numerals and signs, and thus description thereof will not be repeated. In addition, embodiments in the present disclosure in the following description are specific examples of the present invention, and these embodiments are not intended to be limiting unless there is a statement that particularly limits the present invention.

FIG. 1 is a diagram illustrating an example of a system configuration of a data correction system 5 including a data correction device 1 according to an embodiment. As shown in FIG. 1, the data correction system 5 is configured to include the data correction device 1, (one or more) mobile terminals 2, (one or more) base stations 3, and a network 4. Hereinafter, each element of the data correction system 5 will be described.

The data correction device 1 is a computer device such as a server device that generates a filter on the basis of positioning information relating to positioning and applies the generated filter to data based on position data acquired by the positioning to thereby correct the data. The details of the data correction device 1 will be described later.

The mobile terminal 2 is a computer device such as a moving object communication terminal that performs moving object communication. The mobile terminal 2 performs wireless communication with the base station 3 which is in a service area, and communicates with the Internet or another mobile terminal 2 through the network 4. The mobile terminal 2 is carried by a user of the mobile terminal 2. In the embodiment, a smartphone is assumed as the mobile terminal 2, but there is no limitation thereto. The mobile terminal 2 is assumed to have a device, a function, and the like such as a sensor included in a general smartphone.

Figure 2:
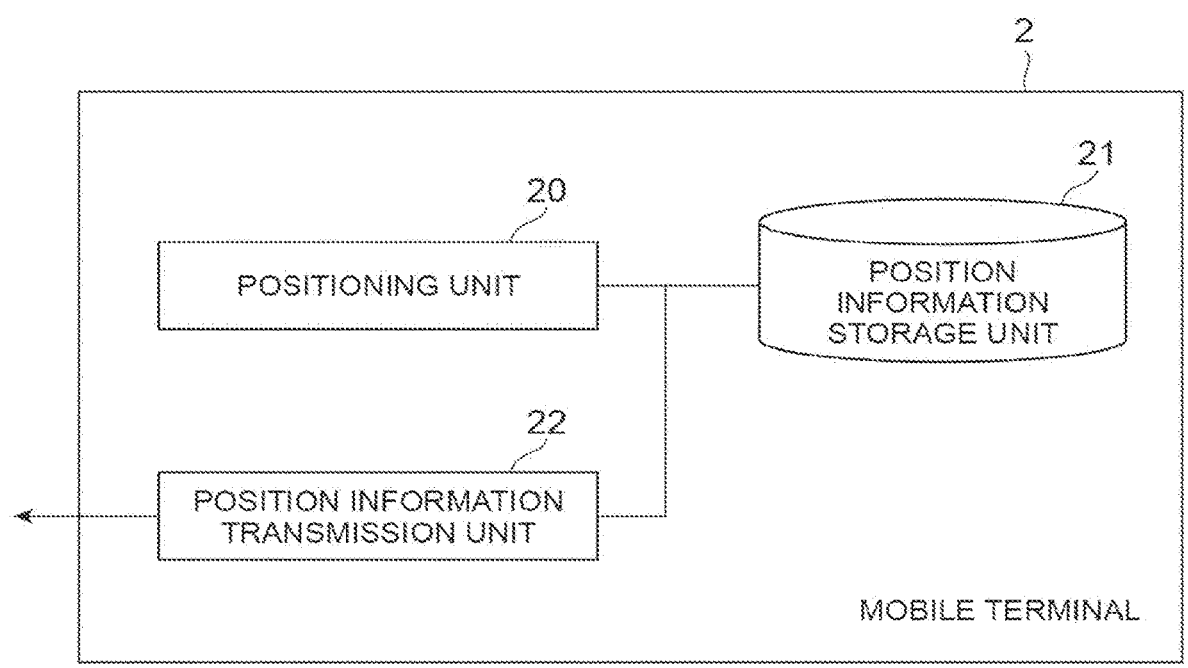
FIG. 2 is a diagram illustrating an example of a functional configuration of a mobile terminal according to the embodiment.

FIG. 2 is a diagram illustrating an example of a functional configuration of the mobile terminal 2 according to the embodiment. As shown in FIG. 2, the mobile terminal 2 is configured to include a positioning unit 20, a position information storage unit 21, and a position information transmission unit 22.

The positioning unit 20 acquires, through positioning, current position (location) data of the mobile terminal 2 and positioning information relating to the positioning, and causes the position information storage unit 21 to store position (location) information including the acquired position (location) data and the positioning information. More specifically, the mobile terminal 2 includes a GPS unit and performs positioning using the GPS unit (GPS positioning). The mobile terminal 2 acquires, through GPS positioning, position data including the current latitude and longitude of the mobile terminal 2 and positioning information including at least one of a positioning interval or a positioning error during the GPS positioning. The positioning information may include any information relating to positioning. The positioning unit 20 may acquire the position data and the positioning information at positioning intervals specified in the specification of a predetermined application installed in advance in the mobile terminal 2, may acquire the position data and the positioning information periodically (for example, every minute), or may acquire the position data and the positioning information at a timing based on an instruction from a user or the like. Generally, GPS positioning makes it possible to acquire high-accuracy (more accurate than a predetermined reference or other positioning) position data. However, in a case where the mobile terminal 2 is in an environment where GPS radio waves cannot be received normally such as underground, in a tunnel, or in a building, the position data cannot be acquired or only low-accuracy position data can be acquired. Meanwhile, the mobile terminal 2 may acquire the position information on the basis of base station information of the base station 3, WiFi (registered trademark), a beacon, or the like without using the GPS positioning. In addition, the positioning information may not be included in the position information in the mobile terminal 2 (the positioning information is appropriately added in a process on the data correction device 1 side).

The positioning unit 20 may further include data other than the position data and positioning data in the position information. For example, the positioning unit 20 may further include terminal identification information for identifying the mobile terminal 2 that is a host device in the position information. In addition, for example, the positioning unit 20 may further include user identification information for identifying a user of the mobile terminal 2 in the position information. In addition, for example, the positioning unit 20 may further include the movement speed (calculated by an acceleration sensor included in the mobile terminal 2) of the mobile terminal 2 (positioning target), when position data included in the position information is measured, in the position information.

The position information storage unit 21 stores the position information. More specifically, the position information storage unit 21 stores position information including the position data and the positioning information acquired by the positioning unit 20.

The position information transmission unit 22 transmits the position information to another device. More specifically, the position information transmission unit 22 transmits the position information stored by the position information storage unit 21 or the position information generated by the positioning unit 20 to the data correction device 1 through the base station 3 and the network 4. The position information transmission unit 22 may transmit the position information at time intervals specified as the specification of an application, may transmit the position information periodically (for example, once every ten minutes), or may transmit the position information at a timing based on an instruction from a user or the like.

Referring back to FIG. 1, the base station 3 is a device such as a wireless station that performs wireless communication with the mobile terminal 2. The base station 3 manages base station information capable of specifying a rough or low-accuracy (less accurate than a predetermined reference or other positioning) position of the mobile terminal 2. The position that can be specified by the base station information may be, for example, the position of the base station 3, or may be the central position of a cell formed by the base station 3.

The network 4 is a network such as a moving object communication network. The data correction device 1 and (one or more) base stations 3 are communicably connected to the network 4 by wire or the like. The data correction device 1 and each of the mobile terminals 2 are communicably connected to each other through the base station 3 and the network 4, and can transmit and receive information to and from each other.

Figure 3:
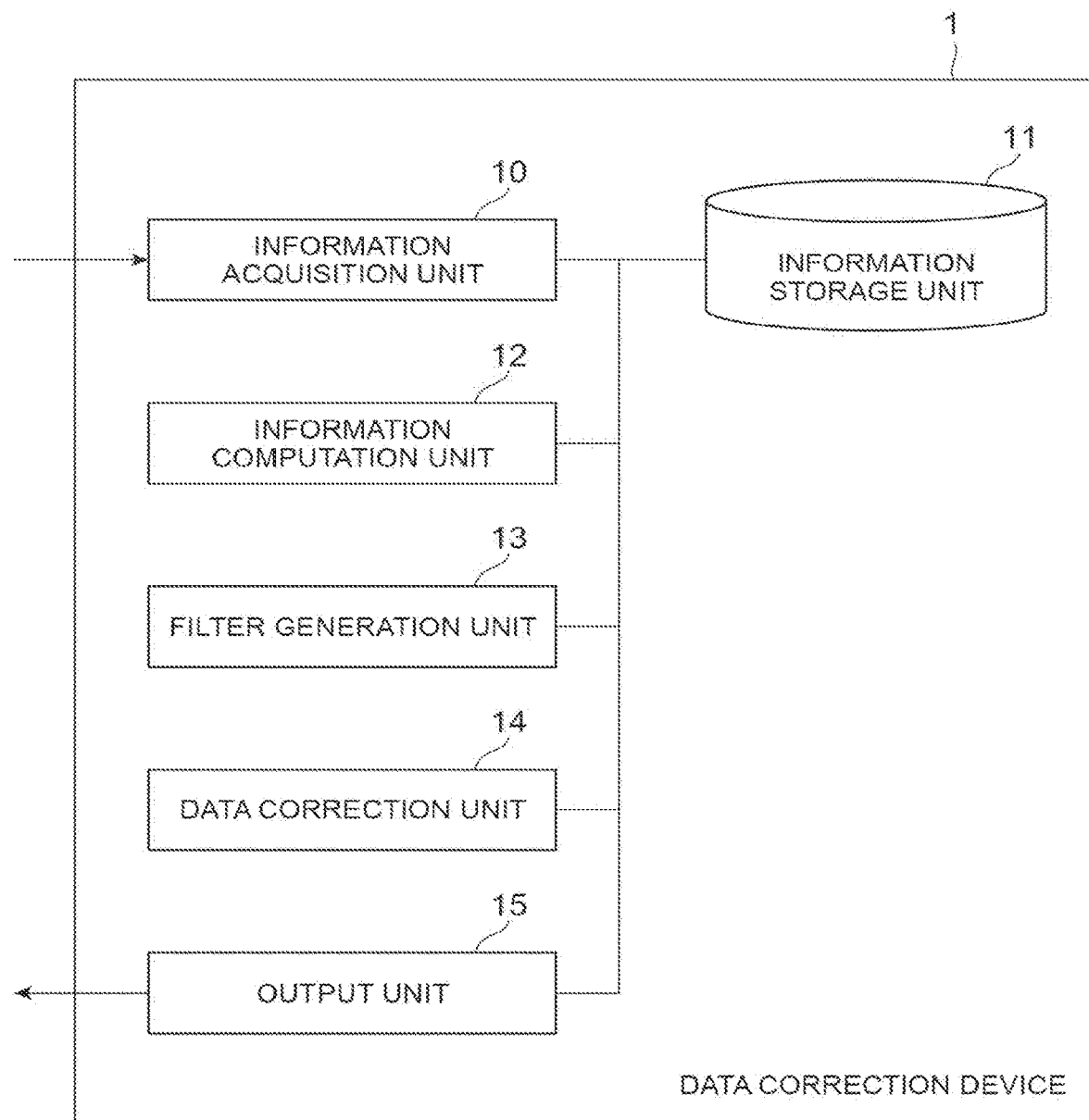
FIG. 3 is a diagram illustrating an example of a functional configuration of the data correction device according to the embodiment.

FIG. 3 is a diagram illustrating an example of a functional configuration of the data correction device 1 according to the embodiment. As shown in FIG. 3, the data correction device 1 is configured to include an information acquisition unit 10, an information storage unit 11 (a storage unit), an information computation unit 12, a filter generation unit 13 (a generation unit), a data correction unit 14 (a correction unit), and an output unit 15 (an output unit).

Each functional block of the data correction device 1 is assumed to function in the data correction device 1, but there is no limitation thereto. For example, some of the functional blocks of the data correction device 1 may function by information being appropriately transmitted to and received from the data correction device 1 within a computer device different from the data correction device 1, the computer device being connected to the data correction device 1 through a network. In addition, some of the functional blocks of the data correction device 1 may be omitted, a plurality of functional blocks may be integrated into one functional block, or one functional block may be decomposed into a plurality of functional blocks.

Hereinafter, each function of the data correction device 1 shown in FIG. 3 will be described.

The information acquisition unit 10 acquires any information. More specifically, the information acquisition unit 10 acquires any information from another device connected through a network or acquires any information stored in the information storage unit 11. The information acquisition unit 10 outputs the acquired information to each function of the data correction device 1.

The information acquisition unit 10 acquires (receives) the position information transmitted by the position information transmission unit 22 of the mobile terminal 2. A process based on the position information within the data correction device 1 after the position information is acquired by the information acquisition unit 10 is assumed to be performed for each terminal identified by terminal identification information included in the position information or for each user identified by user identification information included in the position information (the fact that subsequent processes are performed for each terminal or for each user will be appropriately omitted from the description).

The information storage unit 11 stores any information. More specifically, the information storage unit 11 stores information acquired by the information acquisition unit 10 or appropriately stores information calculated by each function of the data correction device 1. For example, the information storage unit 11 stores position information acquired by the information acquisition unit 10. The information stored by the information storage unit 11 is appropriately referred to by each function of the data correction device 1.

The information computation unit 12 calculates any information. More specifically, the information computation unit 12 calculates any information acquired by the information acquisition unit 10 or calculates any information stored by the information storage unit 11. The information computation unit 12 may cause the information storage unit 11 to store the calculated information. The information computation unit 12 may periodically calculate information, may calculate information at a timing based on an instruction from a user or the like, or may calculate information at a timing based on an instruction from another function of the data correction device 1.

For example, the information computation unit 12 may calculate the position information stored by the information storage unit 11, generate data (correction target data) based on the position information, and cause the information storage unit 11 to store the data. The correction target data is, for example, a matrix based on the position data included in the position information. In addition, for example, in a case where a positioning interval is not included in the position information stored by the information storage unit 11, the information computation unit 12 may calculate the positioning interval on the basis of information (for example, a positioning date and time) included in the position information and include the calculated positioning interval in the position information. In addition, for example, in a case where positioning information is not included in the position information stored by the information storage unit 11, the information computation unit 12 may acquire positioning information that can be acquired on the network side (such as, for example, a router to which the base station 3 and the mobile terminal 2 are connected or any server device within the network 4) and include the acquired positioning information in the position information.

The filter generation unit 13 generates a filter (correction filter) on the basis of the positioning information included in the position information stored by the information storage unit 11. The filter generation unit 13 may generate a filter on the basis of the positioning interval included in the positioning information, may generate a filter on the basis of a positioning error included in the positioning information, may generate a filter on the basis of both the positioning interval and the positioning error included in the positioning information, or may generate a filter on the basis of other information included in the positioning information. The filter generation unit 13 may generate a filter on the basis of positioning information of one user or may generate a filter on the basis of positioning information of each of a plurality of users determined on the basis of a reference determined in advance. In a case where a filter is generated on the basis of the positioning information of each of the plurality of users, the filter generation unit 13 may generate a filter on the basis of the positioning interval included in the positioning information of each of the plurality of users, may generate a filter on the basis of the positioning error included in the positioning information of each of the plurality of users, may generate a filter on the basis of both the positioning interval and the positioning error included in the positioning information of each of the plurality of users, or may generate a filter on the basis of at least one of the positioning interval or the positioning error included in the positioning information of each of the plurality of users (this is not the same among all of the plurality of users and may differ among some or all of the users; for example, a user A uses the positioning interval, a user B uses the positioning error, a user C uses the positioning interval and the positioning error, and the like). The filter generation unit 13 may cause the information storage unit 11 to store the generated filter or may output the filter to the data correction unit 14.

The filter which is generated by the filter generation unit 13 is, for example, a matrix. FIG. 4 is a diagram illustrating an example of a filter. The filter shown in FIG. 4 is a matrix of five rows and five columns.

The filter generation unit 13 may generate a uniform distribution filter (a positioning interval correction filter or a log acquisition interval correction filter) based on the positioning interval. The positioning interval may be a positioning interval (for example, 300 s) specified in the specification of the application of the mobile terminal 2, may be a predetermined time interval (for example, a one minute interval), may be a time interval based on an instruction from a user or the like of the mobile terminal 2, may be an average value of the positioning interval included in the positioning information included in each of any of a plurality of pieces of position information stored by the information storage unit 11, or may be a time interval based on the average value.

For example, in a case where a value based on the positioning interval is n, the filter generation unit 13 may generate a uniform distribution filter of a matrix of n rows and n columns in which all elements are set to "$1/(n*n)$." FIG. 5 is a diagram illustrating an example of a uniform distribution filter of a matrix of n rows and n columns in which all elements are set to "$1/(n*n)$."

The filter generation unit 13 may generate a filter (a positioning interval correction filter or a log acquisition interval correction filter) based on the positioning interval and the movement speed of a positioning target (the mobile terminal 2). The movement speed may be a movement speed included in the position information, may be an average movement speed (for example, 0.8 m/s) of a user (pedestrian) set in advance, or the like. For example, in a case where the movement speed is v [m/s], the positioning interval is t [s], and the length of one side of a predetermined geographical square region (a "narrow-area mesh" to be described later) is a [m], the filter generation unit 13 may generate a uniform distribution filter of a matrix of n rows and n columns which has a relation of "$n=vt/a$" (rounded down; n is an integer) and in which all elements are set to "$1/(n*n)$." For example, in the case of v=0.8, t=300, and a=8, the relation of $n=0.8\times300/8=30$ is established, and thus the filter generation unit 13 generates a uniform distribution filter of a matrix of thirty rows and thirty columns in which all elements are set to "1/900." Meanwhile, in order to reduce the amount of calculation, n may be set to a value smaller than the above calculation result.

The filter generation unit 13 may generate a normal distribution filter (a positioning error correction filter) based on the positioning error. For example, the filter generation unit 13 generates a two-dimensional normal distribution filter having a positioning error µ and a standard deviation a.

The filter generation unit 13 may generate a filter (a positioning error correction filter) based on the positioning error for each positioning means (for example, GPS) of the mobile terminal 2. For example, the filter generation unit 13 generates a two-dimensional normal distribution filter having an average value of 5 [m] which is a GPS positioning error and a standard deviation of 1 [m].

The filter generation unit 13 may generate a filter (correction filter) based on a filter generated on the basis of the positioning interval (for example, a filter generated by any of the above methods on the basis of the positioning interval) and a filter generated on the basis of the positioning error (for example, a filter generated by any of the above methods on the basis of the positioning error). More specifically, the filter generation unit 13 may generate a filter obtained by weighting a filter generated on the basis of the positioning interval and a filter generated on the basis of the positioning error and then synthesizing these filters. The synthesis of filters is realized, for example, by performing uniform weighting on each element and calculating a total value as shown in the expression "$C_{ij}=m*A_{ij}+(1-m)*B_{ij}$." Here, in (a range of values that it can take is 0<m<1; for example, m=0.5) indicates a weighting coefficient, $C_{ij}$ indicates an element of a matrix C after synthesis, $A_{ij}$ indicates an element of a matrix A of the positioning interval correction filter, and $B_{ij}$ indicates an element of a matrix B of the positioning error correction filter.

The data correction unit 14 applies a filter generated by the filter generation unit 13 on the basis of the positioning information included in the position information to data (correction target data) based on position data included in the position information to thereby correct the data.

More specifically, first, the data correction unit 14 acquires a filter which is input by the filter generation unit 13 and generated by the filter generation unit 13 or a filter which is stored by the information storage unit 11 and generated by the filter generation unit 13. Next, the data correction unit 14 acquires correction target data stored by the information storage unit 11 which is correction target data based on position data included in position information including positioning information based on the time when the acquired filter is generated (position data associated with the positioning information). Meanwhile, as described above, the correction target data may be generated by the information computation unit 12 on the basis of the position information and stored in advance by the information storage unit 11, or (the correction target data) may be acquired in advance by the information acquisition unit 10 and stored in advance by the information storage unit 11. Next, the data correction unit 14 corrects the correction target data by applying the acquired filter to the acquired correction target data and generates correction data which is data that has been corrected. The data correction unit 14 may cause the information storage unit 11 to store the generated correction data, may output the generated correction data to the output unit 15, or may output the data to another device or the like through the network 4.

The output unit 15 outputs any information. More specifically, the output unit 15 may output any information stored in the information storage unit 11 or may output any information generated by each function within the data correction device 1. In addition, the output unit 15 may output (transmit) any information to another device connected through a network or may output (display) the information to a user or the like of the data correction device 1 through an output device 1006 to be described later. For example, the output unit 15 outputs the correction data generated by the data correction unit 14 to the user of the data correction device 1.

Next, an example of a process (a data correction method) which is executed by the data correction system 5 will be described with reference to the flowcharts of FIGS. 6 to 8.

Figure 6:
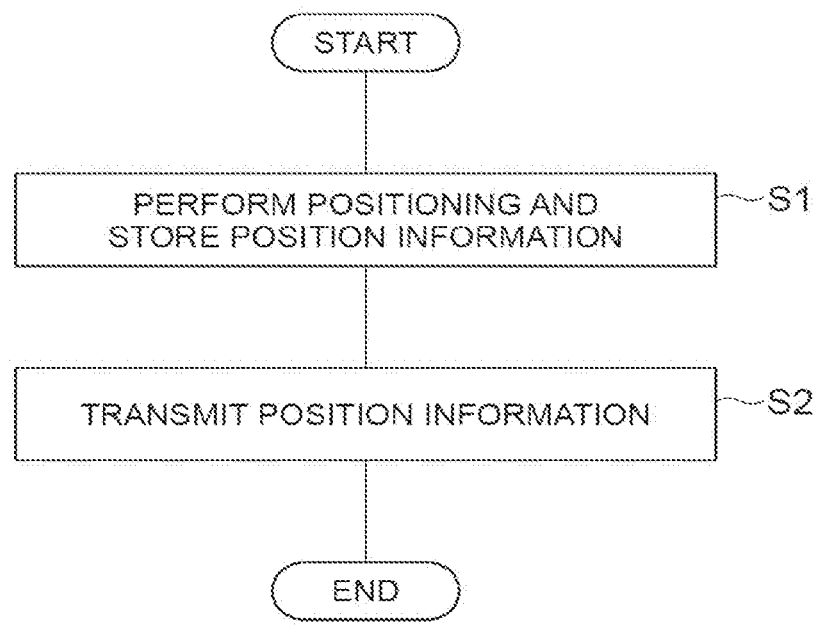
FIG. 6 is a flowchart illustrating an example of a positioning process which is executed by the mobile terminal according to the embodiment.

FIG. 6 is a flowchart illustrating an example of a positioning process which is executed by the mobile terminal 2. First, the positioning unit 20 performs positioning, acquires position information including position data and positioning information, and causes the position information storage unit 21 to store the acquired position information (step S1). Next, the position information transmission unit 22 transmits the position information acquired in S1 or the position information stored in S1 to the data correction device 1 through the base station 3 and the network 4 (step S2). Meanwhile, before S2 is executed, S1 may be executed repeatedly two or more times. In addition, after S2 is executed, the process may return to S1, and the series of processes of S1 and S2 may be executed repeatedly. In addition, instead of storing the position information in S1, the position information acquired in S1 may be transmitted directly in S2 (without being stored by the position information storage unit 21).

Figure 7:
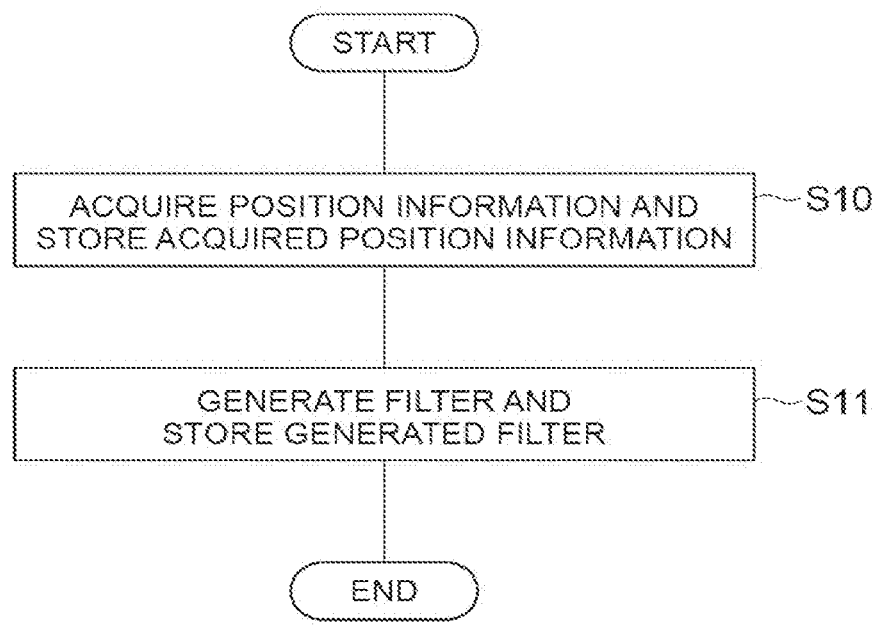
FIG. 7 is a flowchart illustrating an example of a filter generation process which is executed by the data correction device according to the embodiment.

FIG. 7 is a flowchart illustrating an example of a filter generation process which is executed by the data correction device 1. First, the information acquisition unit 10 acquires the position information transmitted from the mobile terminal 2 and causes the information storage unit 11 to store the acquired position information (step S10). Next, the filter generation unit 13 generates a filter on the basis of the positioning information included in the position information stored in S10 and causes the information storage unit 11 to store the generated filter (step S11). Meanwhile, instead of storing the position information in S10, the filter may be generated directly in S11 (without being stored by the information storage unit 11) on the basis of the position information acquired in S10.

Figure 8:
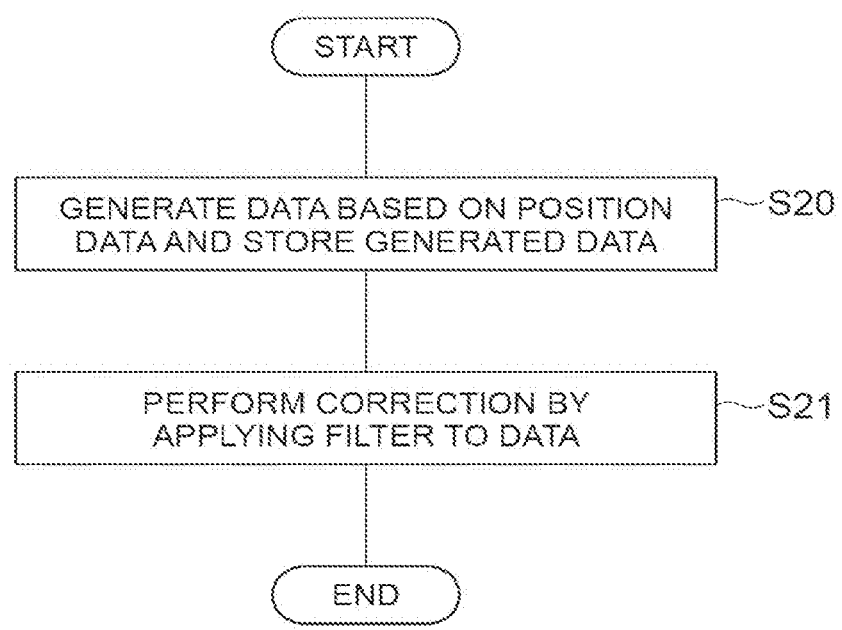
FIG. 8 is a flowchart illustrating an example of a filter application process which is executed by the data correction device according to the embodiment.

FIG. 8 is a flowchart illustrating an example of a filter application process which is executed by the data correction device 1. First, the information computation unit 12 generates correction target data which is data based on the position data included in the position information stored by the information storage unit 11 and causes the information storage unit 11 to store the generated correction target data (step S20). Next, the data correction unit 14 corrects the correction target data by applying the filter stored by the information storage unit 11 (the filter stored in S11 of FIG. 7) to the correction target data stored in S20 and generates correction data which is data that has been corrected (step S21). Meanwhile, instead of storing the correction target data in S20, the filter may be applied directly to the correction target data generated in S20 (without being stored by the information storage unit 11) in S21.

Next, a specific example of the data correction system 5 will be described with reference to FIGS. 9 to 11. In the specific example, the data correction system 5 is used to estimate a population distribution.

Figure 9:
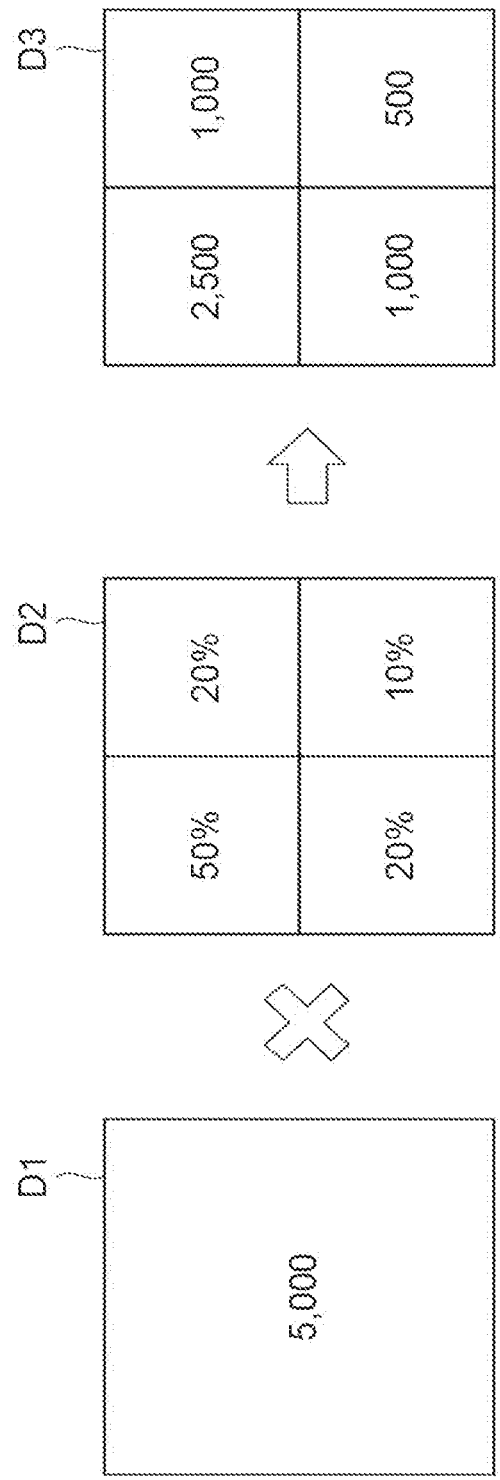
FIG. 9 is a diagram illustrating a method of estimating a population distribution in a specific example.

FIG. 9 is a diagram illustrating a method of estimating a population distribution in a specific example. FIG. 9 shows a flow of estimating high-resolution population distribution data D3 through an estimation process based on low-resolution population distribution data D1 and high-accuracy positioning data D2.

The low-resolution population distribution data D1 indicates a population estimated to be present in a wide-area mesh (a mesh shown by the square in D1 of FIG. 9) which is a predetermined geographical region. The low-resolution population distribution data D1 shown in FIG. 9 indicates that 5,000 people are estimated to be present in the wide-area mesh. The low-resolution population distribution data D1 is calculated on the basis of, for example, operation data of the base station 3 (the number of users is tens of millions) such as the above-described base station information. Since the low-resolution population distribution data is calculated on the basis of the operation data of the base station 3, the wide-area mesh becomes a low-resolution quadrilateral region of which one side is 125 m, 250 m, 500 m, or the like due to a restriction based on the cell range of the base station 3 or the like. In a case where the length of one side of the wide-area mesh is set to be shorter than that, that is, the resolution is set to be higher, the accuracy of the calculated data is reduced.

The high-accuracy positioning data D2 indicates the ratio of a population (population ratio) estimated to be present in each of (high-resolution) narrow-area meshes obtained by dividing the wide-area mesh (indicated by the low-resolution population distribution data D1). The high-accuracy positioning data D2 shown in FIG. 9 indicates that the wide-area mesh is divided into four narrow-area meshes and that the population ratios of the narrow-area meshes are 50%, 20%, 20%, and 10%, respectively, in order in a Z direction. In the high-accuracy positioning data D2, for example, the population of each narrow-area mesh is calculated on the basis of position data acquired by positioning of the mobile terminals 2 (the number of users is several million) in which applications are installed, and the population ratio of each narrow-area mesh is calculated on the basis of the calculated population of each narrow-area mesh. Since the population of each narrow-area mesh is calculated on the basis of, for example, high-accuracy position data (an error is, for example, several meters to several tens of meters) acquired by GPS positioning, the high-accuracy positioning data D2 is based on high-accuracy data. However, since the number of mobile terminals 2 (the number is several million) in which applications are installed is smaller than the total number of mobile terminals 2 (the number is tens of millions) (for example, managed by a mobile communication network operator), that is, the number of samples is limited, the population ratio is used as described above.

The high-resolution population distribution data D3 indicates a population estimated to be present in each of the narrow-area meshes (indicated by the high-accuracy positioning data D2). The high-resolution population distribution data D3 shown in FIG. 9 indicates that 2,500 people, 1,000 people, 1,000 people, and 500 people are estimated to be present in the narrow-area meshes in order in the Z direction. The high-resolution population distribution data D3 is calculated by proportionally dividing the population of 5,000 people in the wide-area mesh of the low-resolution population distribution data D1 by the population ratios of 50%, 20%, 20%, and 10% in the narrow-area meshes of the high-accuracy positioning data D2 (5,000 people×50%=2,500 people, 5,000 people×20%=1,000 people, 5,000 people×20%=1,000 people, and 5,000 people×10%=500 people in the Z direction in the narrow-area meshes).

In the above-described estimation method, the low-resolution population distribution data D1 and the high-accuracy positioning data D2 may be calculated for each attribute (demographic) of a person, and the high-resolution population distribution data D3 for each attribute may be calculated on the basis of the low-resolution population distribution data D1 and the high-accuracy positioning data D2 for each attribute. Examples of the attribute include sex, age, hobbies, preferences, and the like, and combinations thereof (females in their 30s, males in their 50s, and the like). In addition, in the above-described estimation method, the low-resolution population distribution data D1 and the high-accuracy positioning data D2 may be calculated for each time slot, and the high-resolution population distribution data D3 for each time slot may be calculated on the basis of the low-resolution population distribution data D1 and the high-accuracy positioning data D2 for each time slot. Examples of the time slot include between 7 and 8 o'clock, between 8 and 9 o'clock, between 9 and 10 o'clock, and the like. The attributes and the time slots may be used in combination.

Here, in the position data acquired by positioning which is used in the calculation of the high-accuracy positioning data D2 in the above-described estimation method, since the number of samples is limited, a bias occurs in the population of each narrow-area mesh calculated on the basis of the position data acquired by positioning. Consequently, the calculated population of each narrow-area mesh is corrected using the data correction device 1 (the data correction system 5). Meanwhile, instead of the calculated population of each narrow-area mesh, the calculated population ratio of each narrow-area mesh may be corrected using the data correction device 1 (the data correction system 5).

In a case where the data correction device 1 is used in the estimation of the population distribution, the following modification examples can be given with respect to the data correction device 1. That is, the position data is obtained by positioning on the mobile terminal 2 carried by a user. In addition, the data correction unit 14 applies a filter to the population distribution data (the population of each narrow-area mesh in the above-described specific example) based on the position data of the mobile terminal 2 carried by each of a plurality of users. In addition, the output unit 15 outputs the population of a predetermined region (narrow-area mesh), the population ratio of each predetermined region (narrow-area mesh) (calculated on the basis of the population of each predetermined region), or a heat map based on the population ratio of each predetermined region (narrow-area mesh), on the basis of the population distribution data corrected by the data correction unit 14.

Figure 10:
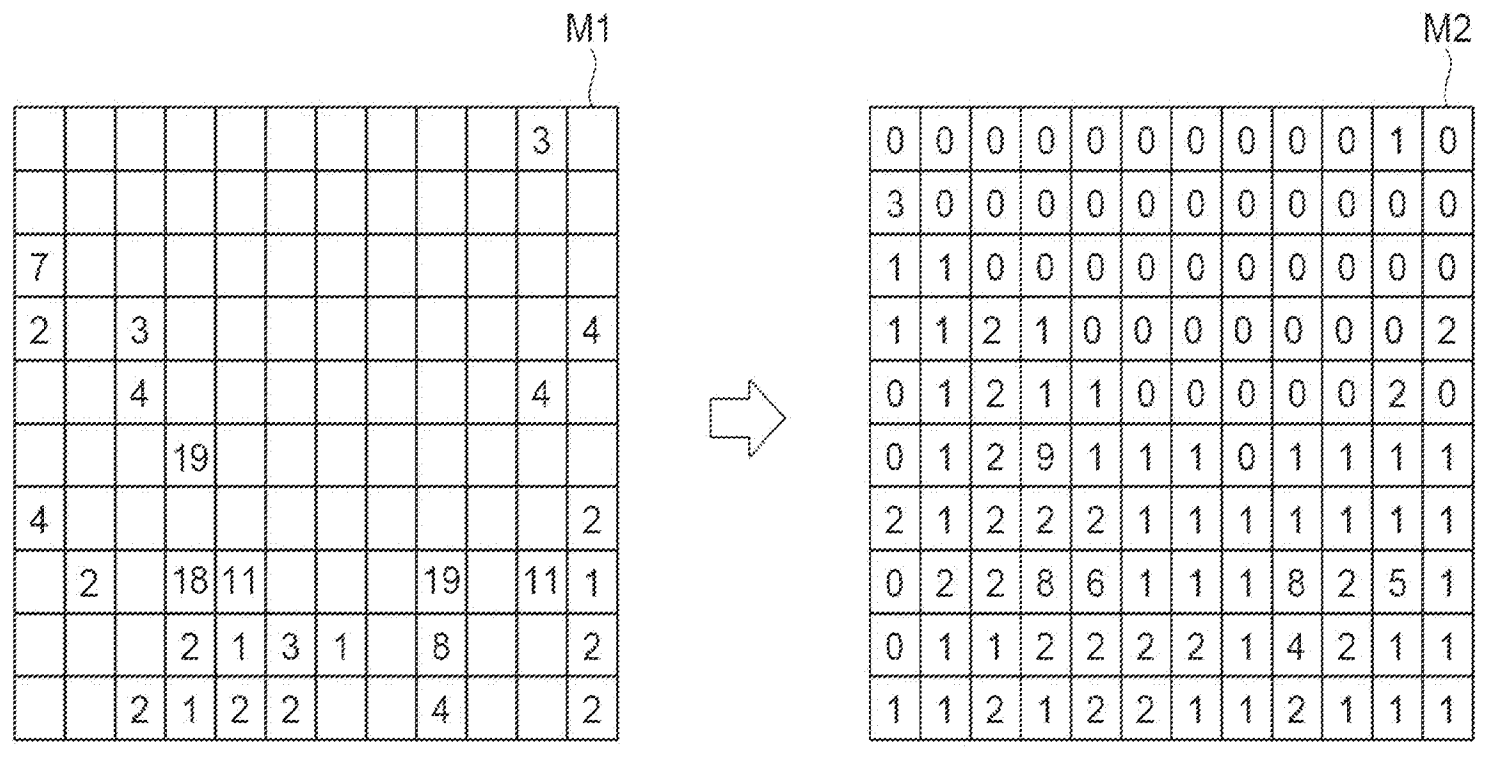

FIG. 10 is a diagram illustrating an example of correction in which a filter is applied to a data distribution. In FIG. 10, a data distribution M1 is represented by a matrix, and each element of the matrix indicates the population of each narrow-area mesh calculated on the basis of the position data acquired by positioning. A data distribution M2 is corrected by applying a filter to the data distribution M1. As shown in FIG. 10, the data distribution M2 is a distribution obtained by smoothing the data distribution M1.

Figure 11:
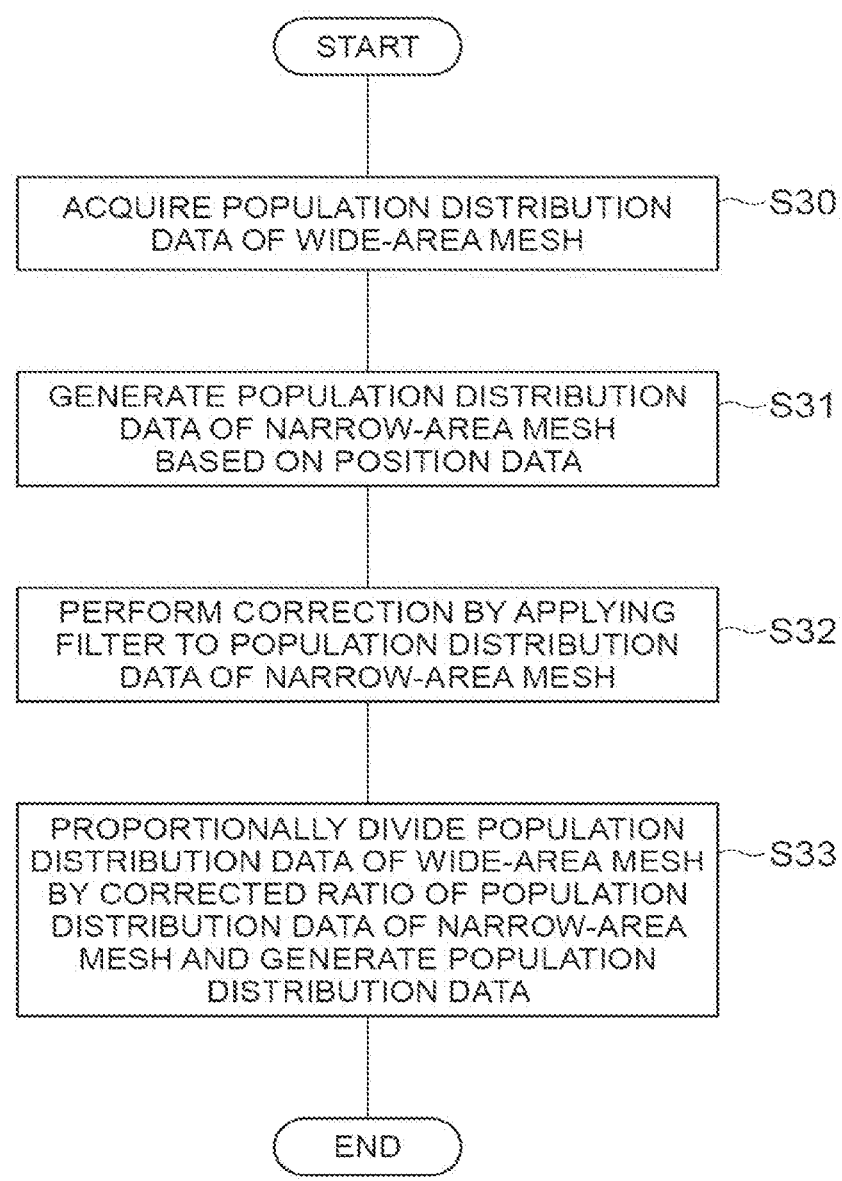
FIG. 11 is a flowchart illustrating an example of a population distribution data correction process which is executed by the data correction device according to the embodiment in the specific example.

FIG. 11 is a flowchart illustrating an example of a population distribution data correction process which is executed by the data correction device 1 in the specific example. First, the data correction unit 14 acquires low-resolution population distribution data (for example, the low-resolution population distribution data D1) of a wide-area mesh stored in advance by the information storage unit 11 (step S30). Next, the information computation unit 12 generates population distribution data of a narrow-area mesh (for example, the population of each narrow-area mesh) on the basis of the position data which is acquired by positioning of the mobile terminal 2 and stored in advance by the information storage unit 11 (step S31). Next, the data correction unit 14 performs correction by applying the filter generated by the filter generation unit 13 (on the basis of the position information acquired by positioning of the mobile terminal 2) to the population distribution data of the narrow-area mesh generated in S31 (step S32). Next, the information computation unit 12 or the data correction unit 14 proportionally divides the low-resolution population distribution data of the wide-area mesh acquired in S30 by a ratio based on the population distribution data of the narrow-area mesh (for example, the high-accuracy positioning data D2) corrected in S32 and generates final population distribution data (for example, the high-resolution population distribution data D3) (step S33). Meanwhile, S30 is not limited to the above-described order and may be executed at any timing insofar as it is before S33.

Next, operational effects of the data correction device 1 according to the embodiment will be described.

According to the data correction device 1, the device includes an information storage unit 11 that stores position information including position data acquired by positioning and positioning information relating to the positioning, a filter generation unit 13 that generates a filter on the basis of the positioning information included in the position information stored by the information storage unit 11, and a data correction unit 14 that applies the filter generated by the filter generation unit 13 on the basis of the positioning information included in the position information to data based on the position data included in the position information to thereby correct the data. With such a configuration, the filter generated on the basis of the positioning information relating to positioning is applied to data based on the position data acquired by positioning, and thus the data is corrected. That is, it is possible to appropriately correct the data based on the position data acquired by positioning.

The positioning information may be at least one of a positioning interval or a positioning error. In a case where the positioning information is a positioning interval, it is possible to perform correction for reflecting the movement of a positioning target (for example, the mobile terminal 2) before and after positioning in consideration of the positioning interval. For example, in a case where the positioning interval is long, it is possible to take a large area to cover, disperse data itself in the part that can be positioned only sporadically, and generate it in a pseudo manner so as to cover the part that cannot be positioned originally. In a case where the positioning information is a positioning error, it is possible to perform correction for reflecting the characteristics of a positioning error (that differs depending on positioning means). That is, it is possible to design a filter according to the distribution of errors. For example, as the positioning error becomes larger, the more distributed data may be dispersed. Even when (users of) the mobile terminals 2 are intensively staying in a certain place, an error will occur when they are inside the building, and thus it is possible to put a normal distribution in a filter in consideration of this situation.

In addition, according to the data correction device 1, the filter generation unit 13 may generate a uniform distribution filter based on a positioning interval. With such a configuration, it is possible to perform correction in which a positioning interval is reflected in a uniform distribution.

In addition, according to the data correction device 1, the filter generation unit 13 may generate a filter based on a positioning interval and a movement speed of a positioning target. With such a configuration, it is possible to reflect the movement speed of the positioning target in the correction.

In addition, according to the data correction device 1, the filter generation unit 13 may generate a normal distribution filter based on a positioning error. With such a configuration, it is possible to perform correction in which a positioning error is reflected in a normal distribution.

In addition, according to the data correction device 1, the filter generation unit 13 may generate a filter based on a positioning error for each positioning means. With such a configuration, it is possible to reflect a positioning error for each positioning means in the correction.

In addition, according to the data correction device 1, the filter generation unit 13 may generate a filter based on a filter generated on the basis of a positioning interval and a filter generated on the basis of a positioning error. With such a configuration, it is possible to generate a filter in which the advantages of both filters are incorporated.

In addition, according to the data correction device 1, the filter generation unit 13 may generate a filter obtained by weighting a filter generated on the basis of a positioning interval and a filter generated on the basis of a positioning error and then synthesizing these filters. With such a configuration, it is possible to generate a filter in which the advantages of both filters are weighted and then incorporated.

In addition, according to the data correction device 1, the position data may be obtained by positioning on the mobile terminal 2 carried by a user, and the data correction unit 14 may apply a filter to population distribution data based on the position data of the mobile terminal 2 carried by each of a plurality of users. With such a configuration, it is possible to obtain appropriately corrected population distribution data based on positioning of each of the mobile terminals 2 carried by each user.

In addition, the data correction device 1 may further include an output unit 15 that outputs a population of a predetermined region, a population ratio of each predetermined region, or a heat map based on the population ratio of each predetermined region, on the basis of the population distribution data corrected by the data correction unit 14. With such a configuration, it is possible to output the corrected population distribution data to a user of the data correction device 1 in an easy-to-understand manner.

As described above, the data correction device 1 according to the embodiment can estimate a high-resolution population distribution in a designated region. The problems of the related art are that it is difficult to estimate densely populated areas (overlapping passersby) and wide areas (remote passersby), and that an estimation error for the amount of traffic increases in a case where the number of samples of positioning data is insufficient. The data correction device 1 can estimate a high-accuracy population distribution in any designated area at a low processing cost by applying a filter considering a positioning interval and a positioning error, for example, applying a filter in which a uniform distribution considering a positioning interval and a normal distribution considering a positioning error are superimposed. The data correction device 1 can calculate the number of people in a densely populated area. The data correction device 1 can improve the accuracy of estimation of a population distribution by applying a filter considering a positioning interval. Generally, in data having a limited number of samples, a bias occurs in the population ratio after expansion estimation. According to the data correction device 1, it is possible to correct the distribution of data by applying a filter considering a positioning interval and a positioning error. The data correction device 1 can apply a correction filter to data based on high-accuracy positioning having a limited number of samples to thereby suppress the occurrence of a bias of the data at a low processing cost.

The estimation of a population distribution using the data correction system 5 can be applied to various fields. For example, it can be applied to estimate the number of viewers of outdoor advertisements such as distal out of home (DOOH). As a result, it is possible to sell an advertising space on the basis of the number of advertisement viewers (impressions), attributes, and the like.

Meanwhile, the block diagram used in the description of the above embodiment represents blocks in units of functions. These functional blocks (constituent elements) are realized by any combination of at least one of hardware and software. In addition, a method of realizing each functional block is not particularly limited. That is, each functional block may be realized using one device which is physically or logically coupled, or may be realized using two or more devices which are physically or logically separated from each other by connecting the plurality of devices directly or indirectly (for example, using a wired or wireless manner or the like). The functional block may be realized by combining software with the one device or the plurality of devices.

Examples of the functions include determining, deciding, judging, calculating, computing, process, deriving, investigating, search, ascertaining, receiving, transmitting, output, access, resolving, selecting, choosing, establishing, comparing, assuming, expecting, considering, broadcasting, notifying, communicating, forwarding, configuring, reconfiguring, allocating (or mapping), assigning, and the like, but there is no limitation thereto. For example, a functional block (constituent element) for causing transmitting to function is referred to as a transmitting unit or a transmitter. As described above, any realization methods are not particularly limited.

Figure 12:
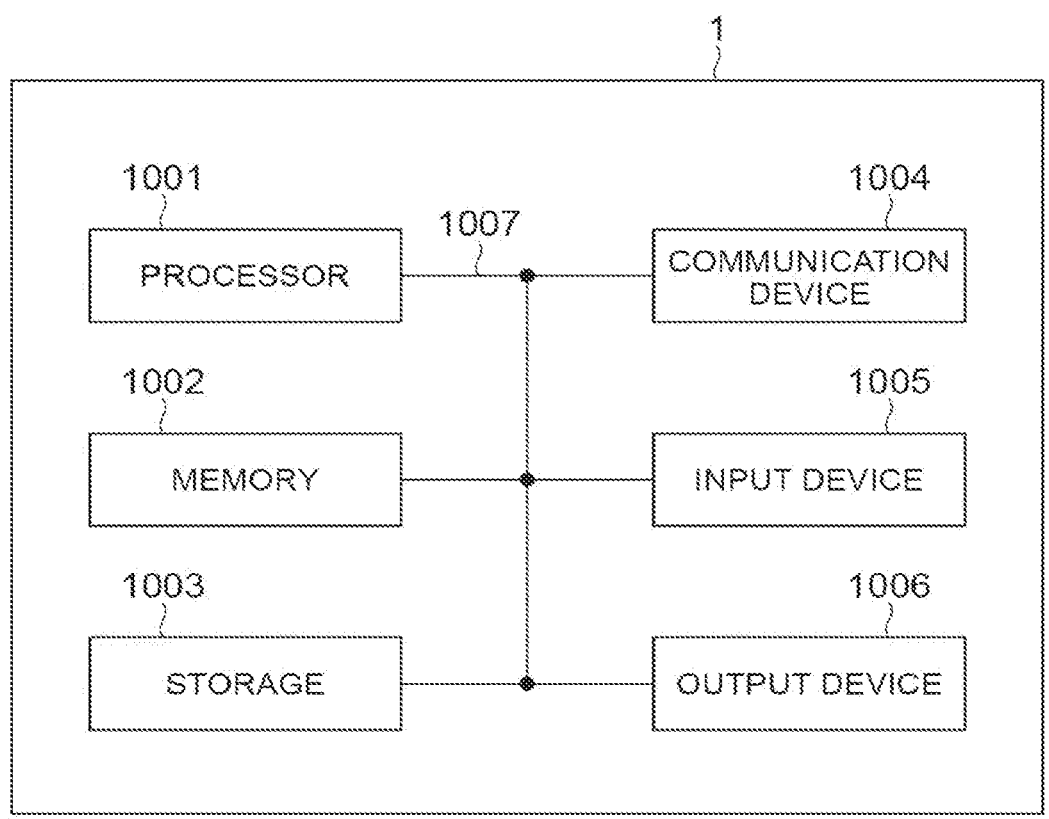
FIG. 12 is diagram illustrating an example of a hardware configuration of a computer which is used in the data correction device according to the embodiment.

For example, the data correction device 1 or the like in an embodiment of the present disclosure may function as a computer that performs processing of a data correction method of the present disclosure. FIG. 12 is a diagram illustrating an example of a hardware configuration of the data correction device 1 according to an embodiment of the present disclosure. The above-described data correction device 1 may be physically configured as a computer device including a processor 1001, a memory 1002, a storage 1003, a communication device 1004, an input device 1005, an output device 1006, a bus 1007, and the like.

Meanwhile, in the following description, the word "device" may be replaced with "circuit," "unit," or the like. The hardware configuration of the data correction device 1 may be configured to include one or a plurality of devices shown in the drawings, or may be configured without including some of the devices.

The processor 1001 performs an arithmetic operation by reading predetermined software (a program) onto hardware such as the processor 1001 or the memory 1002, and thus each function of the data correction device 1 is realized by controlling communication in the communication device 1004 or controlling at least one of reading-out and writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, the information acquisition unit 10, the information computation unit 12, the filter generation unit 13, the data correction unit 14, the output unit 15, and the like which are described above may be realized by the processor 1001.

In addition, the processor 1001 reads out a program (a program code), a software module, data, or the like from at least one of the storage 1003 and the communication device 1004 into the memory 1002, and executes various types of processes in accordance therewith. An example of the program which is used includes a program causing a computer to execute at least some of the operations described in the foregoing embodiment. For example, the information acquisition unit 10, the information computation unit 12, the filter generation unit 13, the data correction unit 14, and the output unit 15 may be realized by a control program which is stored in the memory 1002 and operates in the processor 1001, and other functional blocks may be realized in the same manner. Although the execution of various types of processes by one processor 1001 has been described above, these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (a program code), a software module, or the like that can be executed in order to carry out a wireless communication method according to an embodiment of the present disclosure.

The storage 1003 is a computer readable recording medium, and may be constituted by at least one of, for example, an optical disc such as a compact disc ROM (CD-ROM), a hard disk drive, a flexible disk, a magneto-optic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including at least one of the memory 1002 and the storage 1003, a server, or another suitable medium.

The communication device 1004 is hardware (a transmitting and receiving device) for performing communication between computers through at least one of a wired network and a wireless network, and is also referred to as, for example, a network device, a network controller, a network card, a communication module, or the like. The communication device 1004 may be configured to include a high-frequency switch, a duplexer, a filter, a frequency synthesizer, or the like in order to realize at least one of, for example, frequency division duplex (FDD) and time division duplex (TDD). For example, the information acquisition unit 10, the output unit 15, and the like described above may be realized by the communication device 1004.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be configured using a single bus, or may be configured using different buses between devices.

In addition, the data correction device 1 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, the processor 1001 may be mounted using at least one of these types of hardware.

Notification of information is not limited to the aspects/embodiments described in the present disclosure, and may be performed using other methods. For example, the notification of information may be performed by physical layer signaling (such as downlink control information (DCI) or uplink control information (UCI)), upper layer signaling (such as radio resource control (RRC) signaling, medium access control (MAC) signaling, or broadcast information (such as a master information block (MIB) and a system information block (SIB)), other signals, or combinations thereof. In addition, the RRC signaling may be referred to as an RRC message and may be referred to as, for example, an RRC connection setup message or an RRC connection reconfiguration message.

The aspects/embodiments described in the present disclosure may be applied to at least one of a system employing long term evolution (LTE), LTE-Advanced (LTE-A), SUPER 3G, IMT-Advanced, a 4th generation mobile communication system (4G), a 5th generation mobile communication system (5G), future radio access (FRA), new Radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended on the basis thereof. In addition, a plurality of systems may be combined (for example, 5G and at least one of LTE and LTE-A are combined or the like) and be applied.

The order of the processing sequences, the sequences, the flowcharts, and the like of the aspects/embodiments described above in the present disclosure may be changed as long as they are compatible with each other. For example, in the methods described in the present disclosure, various steps as elements are presented using an exemplary order but the methods are not limited to the presented specific order.

A specific operation which is performed by a base station in this specification may be performed by an upper node with respect thereto in some cases. In a network constituted by one or a plurality of network nodes including the base station, it is obvious that various operations which are performed to communicate with a terminal can be performed by at least one of the base station and network nodes other than the base station (for example, an MME or an S-GW can be conceived but the network nodes are not limited thereto). A case in which the number of network nodes other than the base station is one has been described above, but a combination of a plurality of different network nodes (for example, an MME and an S-GW) may be used.

Information or the like can be output from an upper layer (or a lower layer) to a lower layer (or an upper layer). Information or the like may be input or output via a plurality of network nodes.

The input or output information or the like may be stored in a specific place (for example, a memory) or may be managed using a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects/embodiments described in the present disclosure may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Hereinbefore, the present disclosure has been described in detail, but it is apparent to those skilled in the art that the present disclosure should not be limited to the embodiments described in the present disclosure. The present disclosure can be implemented as modified and changed aspects without departing from the spirit and scope of the present disclosure, which are determined by the description of the scope of claims. Therefore, the description of the present disclosure is intended for illustrative explanation only, and does not impose any limited interpretation on the present disclosure.

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, software, a command, information, and the like may be transmitted and received through a transmission medium. For example, when software is transmitted from a website, a server, or another remote source using at least one of wired technology (such as a coaxial cable, an optical fiber cable, a twisted-pair wire, or a digital subscriber line (DSL)) and wireless technology (such as infrared rays or microwaves), at least one of the wired technology and the wireless technology are included in the definition of a transmission medium.

Information, a signal or the like described in the present disclosure may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in the present disclosure and the terms required for understanding the present disclosure may be substituted by terms having the same or similar meanings.

The terms "system" and "network" which are used in the present disclosure are used interchangeably.

In addition, information, parameters, and the like described in the present disclosure may be expressed using absolute values, may be expressed using values relative to a predetermined value, or may be expressed using other corresponding information. For example, radio resources may be indicated by indices.

The names used for the above-described parameters are not limited in any way. Further, mathematical formulas and the like using these parameters may differ from those explicitly disclosed in the present disclosure.

In the present disclosure, the terms "base station (BS)," "wireless base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like may be used interchangeably. The base station may also be referred to as a macro-cell, a small cell, a femtocell, a pico-cell, or the like.

The base station can cover one or a plurality of (for example, three) cells. In a case where the base station covers a plurality of cells, the entire coverage area of the base station can be partitioned into a plurality of smaller areas, and each smaller area can also provide a communication service through a base station subsystem (for example, an indoor small base station (RRH: Remote Radio Head). The term "cell" or "sector" refers to a portion or the whole of the coverage area of at least one of a base station and a base station subsystem that perform a communication service in this coverage.

In the present disclosure, the terms "mobile station (MS)," "user terminal," "user equipment (UE)," "terminal," and the like may be used interchangeably.

The mobile station may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

At least one of the base station and the mobile station may be referred to as a transmitting device, a receiving device, a communication device, or the like. Meanwhile, at least one of the base station and the mobile station may be a device mounted in a moving object, the moving object itself, or the like. The moving object may be a vehicle (such as, for example, a car or an airplane), may be a moving object that moves in an unmanned manner (such as, for example, a drone or an automated driving vehicle), or may be a robot (manned type or unmanned type). Meanwhile, at least one of the base station and the mobile station also includes a device that does not necessarily move during a communication operation. For example, at least one of the base station and the mobile station may be an internet of things (IoT) instrument such as a sensor.

In addition, the base station in the present disclosure may be replaced with a user terminal. For example, each aspect/embodiment of the present disclosure may be applied to a configuration in which communication between a base station and a user terminal is replaced with communication between a plurality of users terminals (which may be referred to as, for example, device-to-device (D2D), vehicle-to-everything (V2X), or the like). In this case, the mobile terminal 2 may be configured to have the functions of the base station 3 described above. In addition, the words such as "upstream" and "downstream" may be replaced with words corresponding to communication between terminals (for example, "side"). For example, a upstream channel, a downstream channel, or the like may be replaced with a side channel.

Similarly, the user terminal in the present disclosure may be replaced with a base station. In this case, the base station 3 may be configured to have the functions of the mobile terminal 2 described above.

The term "determining" which is used in the present disclosure may include various types of operations. The term "determining" may include regarding operations such as, for example, judging, calculating, computing, processing, deriving, investigating, looking up/search/inquiry (for example, looking up in a table, a database or a separate data structure), or ascertaining as an operation such as "determining." In addition, the term "determining" may include regarding operations such as receiving (for example, receiving information), transmitting (for example, transmitting information), input, output, or accessing (for example, accessing data in a memory) as an operation such as "determining" In addition, the term "determining" may include regarding operations such as resolving, selecting, choosing, establishing, or comparing as an operation such as "determining" That is, the term "determining" may include regarding some kind of operation as an operation such as "determining" In addition, the term "determining" may be replaced with the term "assuming," "expecting," "considering," or the like.

The terms "connected" and "coupled" and every modification thereof refer to direct or indirect connection or coupling between two or more elements and can include that one or more intermediate element is present between two elements "connected" or "coupled" to each other. The coupling or connecting of elements may be physical, may be logical, or may be a combination thereof. For example, "connection" may be read as "access." In the case of use in the present disclosure, two elements can be considered to be "connected" or "coupled" to each other using at least one of one or more electrical wires, cables, and printed electric connections or using electromagnetic energy or the like having wavelengths in a radio frequency range, a microwave area, and a light (both visible light and invisible light) area as non-restrictive and non-comprehensive examples.

An expression "on the basis of" which is used in the present disclosure does not refer to only "on the basis of only," unless otherwise described. In other words, the expression "on the basis of" refers to both "on the basis of only" and "on the basis of at least."

The term "means" in the configuration of each device may be substituted by the term "unit," "circuit," "device," or the like.

In the present disclosure, when the terms "include," "including," and modifications thereof are used, these terms are intended to have a comprehensive meaning similarly to the term "comprising." Further, the term "or" which is used in the present disclosure is intended not to mean an exclusive logical sum.

In the present disclosure, when articles are added by translation like, for example, "a," "an" and "the" in English, the present disclosure may include that nouns that follow these articles are plural forms.

In the present disclosure, an expression "A and B are different" may mean that "A and B are different from each other." Meanwhile, the expression may mean that "A and B are different from C." The terms "separated," "coupled," and the like may also be construed similarly to "different."

REFERENCE SIGNS LIST

1 Data correction device
2 Mobile terminal

3 Base station
4 Network
5 Data correction system
10 Information acquisition unit
11 Information storage unit
12 Information computation unit
13 Filter generation unit
14 Data correction unit
15 Output unit

The invention claimed is:

1. A data correction device comprising processing circuitry configured to:
   generate a filter based on a positioning error during positioning by positioning means;
   apply the filter to population distribution data generated based on stored position data to thereby correct the population distribution data; and
   output data related to a population, on a basis of the corrected population distribution data.

2. The data correction device according to claim 1, wherein the population distribution data to which the filter is applied is population distribution data of a narrow-area mesh.

3. The data correction device according to claim 1, wherein the processing circuitry is further configured to output a population of a predetermined region, on the basis of the corrected population distribution data.

4. The data correction device according to claim 1, wherein the processing circuitry is further configured to output a population ratio of each predetermined region, on the basis of the corrected population distribution data.

5. The data correction device according to claim 1, wherein the processing circuitry is further configured to output a heat map based on a population ratio of each predetermined region, on the basis of the corrected population distribution data.

6. The data correction device according to claim 1, wherein the positioning error is a positioning error during positioning by positioning means of a mobile terminal.

7. The data correction device according to claim 1, wherein the positioning means is a GPS.

8. The data correction device according to claim 1, wherein the positioning means is a GPS of a mobile terminal.

* * * * *